(12) United States Patent
Liu et al.

(10) Patent No.: US 11,493,271 B2
(45) Date of Patent: Nov. 8, 2022

(54) WATER BLOWING DEVICE

(71) Applicant: CITIC Dicastal Co., Ltd., Qinhuangdao (CN)

(72) Inventors: Weidong Liu, Qinhuangdao (CN); Xiaoying Ma, Qinhuangdao (CN); Shiwen Xu, Qinhuangdao (CN); Minglei Li, Qinhuangdao (CN)

(73) Assignee: CITIC Dicastal Co., Ltd., Ginhuangdao (CN)

( * ) Notice: Subject to any disclaimer, the term of this patent is extended or adjusted under 35 U.S.C. 154(b) by 440 days.

(21) Appl. No.: 16/831,736

(22) Filed: Mar. 26, 2020

(65) Prior Publication Data

US 2021/0088280 A1  Mar. 25, 2021

(30) Foreign Application Priority Data

Sep. 25, 2019  (CN) .......................... 2019109081793

(51) Int. Cl.
*F26B 11/00* (2006.01)
*F26B 21/00* (2006.01)

(52) U.S. Cl.
CPC ............ *F26B 11/00* (2013.01); *F26B 21/004* (2013.01)

(58) Field of Classification Search
CPC ........ B08B 3/022; F26B 11/00; F26B 21/004; B60S 3/042; B23Q 3/14; B23B 31/16
See application file for complete search history.

(56) References Cited

U.S. PATENT DOCUMENTS

| | | | | |
|---|---|---|---|---|
| 1,356,574 A | * | 10/1920 | Warder | B29D 30/0061 279/2.19 |
| 2,207,621 A | * | 7/1940 | Hite | B23B 31/14 279/119 |
| 3,038,280 A | * | 6/1962 | Dralle | B23F 23/08 279/2.19 |
| 3,485,139 A | * | 12/1969 | Sheesley | F03C 1/053 92/72 |
| 5,722,443 A | * | 3/1998 | Marler | B08B 3/02 134/201 |
| 5,848,795 A | * | 12/1998 | Masatsugu | B23B 31/1261 279/143 |
| 7,243,665 B1 | * | 7/2007 | Turner | B60S 3/042 134/123 |
| 10,040,433 B1 | * | 8/2018 | Xue | B60S 3/06 |
| 10,232,454 B2 | * | 3/2019 | Liu | B22D 11/126 |
| 10,500,649 B2 | * | 12/2019 | Xue | B23B 31/16 |
| 2003/0172958 A1 | * | 9/2003 | Murofushi | B08B 3/022 134/25.4 |
| 2009/0025159 A1 | * | 1/2009 | Rau | B08B 1/04 15/53.4 |
| 2012/0167925 A1 | * | 7/2012 | Lo | B08B 3/022 134/70 |
| 2015/0273493 A1 | * | 10/2015 | Xue | B05B 13/0228 239/224 |
| 2016/0353873 A1 | * | 12/2016 | Xue | A46B 13/02 |
| 2016/0354891 A1 | * | 12/2016 | Xue | B24B 29/005 |
| 2016/0361787 A1 | * | 12/2016 | Yang | B23Q 3/14 |
| 2017/0182551 A1 | * | 6/2017 | Xue | B05B 13/0221 |

(Continued)

*Primary Examiner* — Edelmira Bosques
*Assistant Examiner* — Bao D Nguyen
(74) *Attorney, Agent, or Firm* — IPro, PLLC

(57) ABSTRACT

The disclosure discloses a water blowing device which is composed of a wheel positioning rotating part and a wheel water blowing part. The water blowing requirement of the wheel can be met.

4 Claims, 2 Drawing Sheets

(56) References Cited

U.S. PATENT DOCUMENTS

| | | | |
|---|---|---|---|
| 2017/0361412 A1* | 12/2017 | Zhou | B23Q 3/14 |
| 2018/0001363 A1* | 1/2018 | Liu | B21B 45/0233 |
| 2018/0001719 A1* | 1/2018 | Liu | B60C 25/0509 |
| 2018/0003592 A1* | 1/2018 | Liu | G01M 1/225 |
| 2018/0010851 A1* | 1/2018 | Liu | F26B 11/00 |
| 2018/0354041 A1* | 12/2018 | Yang | B23B 31/18 |
| 2019/0022709 A1* | 1/2019 | Liu | B08B 1/002 |
| 2019/0022710 A1* | 1/2019 | Liu | B08B 3/02 |
| 2019/0060941 A1* | 2/2019 | Liu | B05B 12/26 |
| 2019/0063902 A1* | 2/2019 | Liu | B23Q 17/20 |
| 2019/0193121 A1* | 6/2019 | Liu | F26B 25/02 |
| 2020/0215369 A1* | 7/2020 | Ostler | B08B 3/022 |

* cited by examiner

WATER BLOWING DEVICE

TECHNICAL FIELD

The disclosure relates to a water removal device, in particular to a device for removing high-temperature water remained on the outer side of a wheel through a high-pressure spray head before the spraying process of the wheel.

BACKGROUND

In the wheel processing industry, the spraying process is an important link of wheel processing, and the requirement on temperature and wheel surface cleanliness is very high in the spraying process, so that before the spraying process, the wheel needs to be cleaned in high-temperature clean water, and then the residual water in the wheel is removed.

SUMMARY

The disclosure aims to provide a water blowing device.

In order to realize the purpose, the technical scheme of the disclosure is as follows: a water blowing device comprises a wheel positioning rotating part and a wheel water blowing part.

The wheel positioning rotating part comprises a rack, a servo motor A, a connecting shaft, a base, a rotating shaft, a rotary oil cylinder, a bearing A, a bearing end cover A, a base, a bearing B, a bearing end cover B, a shaft, a shaft sleeve, contacts, springs, linear bearings and a synchronous cam.

The servo motor A and the base are mounted on the rack; the rotating shaft is connected with an output shaft of the servo motor A through the connecting shaft; the rotary oil cylinder, the shaft sleeve and the base are mounted on the rotating shaft; the bearing B and the shaft are sealed inside the base by the bearing end cover B, and two ends of the shaft are respectively connected with an output shaft of the rotary oil cylinder and the synchronous cam; three or more linear bearings are uniformly mounted on a side wall of the shaft sleeve; a side wall of the synchronous cam is provided with three or more uniformly distributed arc surfaces; the springs and the linear bearings are arranged on the ends of outer sides of the three or more contacts in a penetrating manner, and the ends of inner sides of the three or more contacts are connected with the arc surfaces of the high-precision synchronous cam; two ends of the springs are respectively in contact with shaft end surfaces of the linear bearings and the contacts; inner side ends of the contacts tightly press against the synchronous cam all the time; and the rotating shaft is mounted on the base through the bearing A and the bearing end cover A.

The water blowing device is characterized in that, the servo motor A drives the rotating shaft to rotate through the bearing A.

The water blowing device is characterized in that, the arc surfaces uniformly distributed on the side wall of the synchronous cam push a series of contacts to synchronously move towards an outer side of a radial direction, and a pitch diameter formed by the outer sides of the series of contacts is increased.

The water blowing device is characterized in that, in a reset process of the rotary oil cylinder, the inner side ends of the contacts are in contact with the synchronous cam all the time, and the series of contacts synchronously move towards an inner side of the radial direction.

The wheel water blowing part comprises a mounting rack, spray nozzles, spray nozzle support frames, mounting seats and sliding chutes.

The mounting rack is fixedly arranged on the rack and is provided with a series of sliding chutes, the mounting seats are mounted in the sliding chutes of the mounting rack, and the spray nozzles are mounted on the mounting seats through the spray nozzle support frames.

Before actual use, the position of the mounting seats in the sliding chutes is adjusted according to the size of the wheel, and the spray nozzles is moved to the optimal water blowing position of the wheel. During actual use, wheels are conveyed to the position right above the device through a conveying system, a series of contacts extend into central holes of the wheels, the rotating oil cylinder can drive the synchronous cam to rotate through the bearing B and the shaft, the arc surfaces uniformly distributed on the side wall of the synchronous cam push the series of contacts to synchronously move radially outwards, the series of contacts finally tighten the central holes of the wheels, the rotating oil cylinder fixes the synchronous cam and the series of contacts in the state, and wheel positioning work is completed. Then, high-pressure air is introduced, the high-pressure air sprayed from the spray nozzles are blown to the wheel, meanwhile, the servo motor A drives the wheel to rotate through the bearing A, and the spray nozzles can be blown off through water at any position on the wheel.

The disclosure can meet the requirement of blowing water for the wheel, and has the characteristics of simple structure, convenient manufacture, stable performance, high positioning precision, simple operation and the like.

Figure 1:
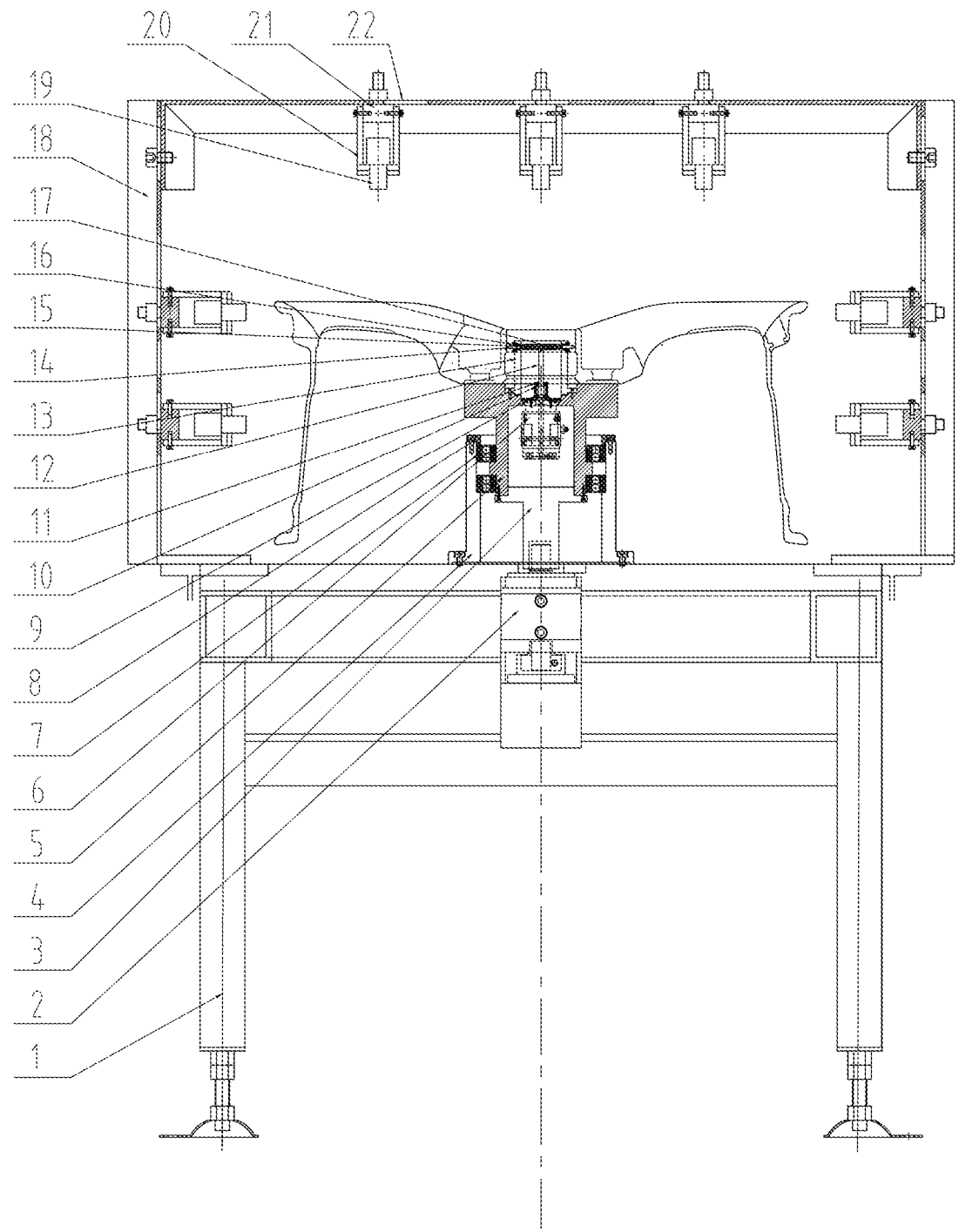
FIG. 1 is a schematic structural view of a water blowing device according to the present disclosure.
Figure 2:
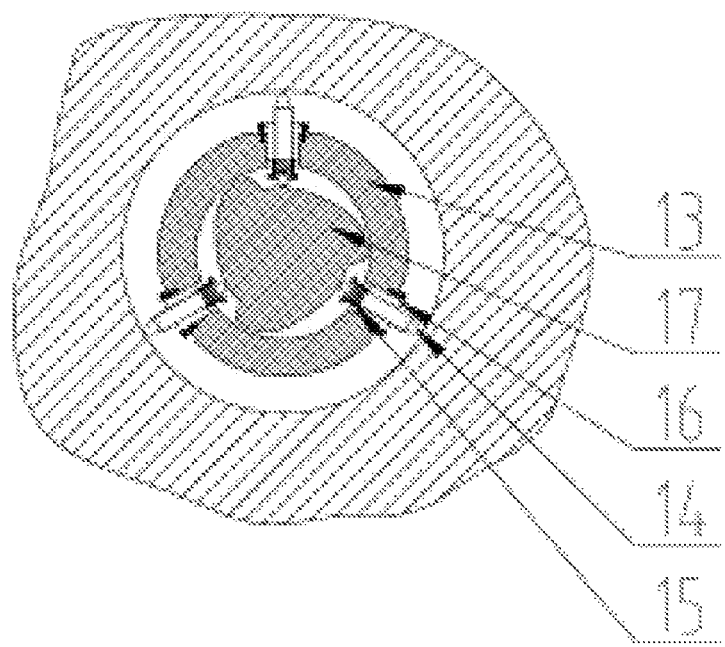
FIG. 2 is a schematic structural view of a tensioning mechanism in the water blowing device.

In the figure, 1—a rack, 2—a servo motor A, 3—a connecting shaft, 4—a base, 5—a rotating shaft, 6—a rotary oil cylinder, 7—a bearing A, 8—a bearing end cover A, 9—a base, 10—a bearing B, 11—a bearing end cover B, 12—a shaft, 13—a shaft sleeve, 14—contacts, 15—springs, 16—a linear bearing 17—a synchronous cam; 18—a mounting rack, 19—spray nozzles 20—spray nozzle support frames, 21—mounting seats, 22—sliding chutes.

DETAILED DESCRIPTION

The details and operation of the particular apparatus proposed according to the present disclosure are explained in detail below with reference to the accompanying drawings.

The disclosure relates to A water blowing device, being composed of a wheel positioning rotating part and a wheel water blowing part.

The wheel positioning rotating part comprises a rack 1, a servo motor A 2, a connecting shaft 3, a base 4, a rotating shaft 5, a rotary oil cylinder 6, a bearing A 7, a bearing end cover A 8, a base 9, a bearing B 10, a bearing end cover B 11, a shaft 12, a shaft sleeve 13, contacts 14, springs 15, linear bearings 16 and a synchronous cam 17.

The servo motor A 2 and the base 4 are mounted on the rack 1; the rotating shaft 5 is connected with an output shaft of the servo motor A 2 through the connecting shaft 3; the rotary oil cylinder 6, the shaft sleeve 13 and the base 9 are mounted on the rotating shaft 5; the bearing B 10 and the shaft 12 are sealed inside the base 9 by the bearing end cover B 11, and two ends of the shaft 12 are respectively connected with an output shaft of the rotary oil cylinder 6 and the synchronous cam 17; three or more linear bearings 16 are uniformly mounted on a side wall of the shaft sleeve 13; a side wall of the synchronous cam 17 is provided with three or more uniformly distributed arc surfaces; the springs 15 and the linear bearings 16 are arranged on the ends of outer sides of the three or more contacts 14 in a penetrating manner, and the ends of inner sides of the three or more contacts 14 are connected with the arc surfaces of the high-precision synchronous cam 17; two ends of the springs 15 are respectively in contact with shaft end surfaces of the linear bearings 16 and the contacts 14; inner side ends of the contacts 14 tightly press against the synchronous cam 17 all the time; and the rotating shaft 5 is mounted on the base 4 through the bearing A 7 and the bearing end cover A 8.

The water blowing device is characterized in that, the servo motor A 2 drives the rotating shaft 5 to rotate through the bearing A 7.

The water blowing device is characterized in that, the arc surfaces uniformly distributed on the side wall of the synchronous cam 17 push a series of contacts 14 to synchronously move towards an outer side of a radial direction, and a pitch diameter formed by the outer sides of the series of contacts 14 is increased.

The water blowing device is characterized in that, in a reset process of the rotary oil cylinder 6, the inner side ends of the contacts 14 are in contact with the synchronous cam 17 all the time, and the series of contacts 14 synchronously move towards an inner side of the radial direction.

The wheel water blowing part comprises a mounting rack 18, spray nozzles 19, spray nozzle support frames 20, mounting seats 21 and sliding chutes 22.

The mounting rack 18 is fixedly arranged on the rack 1 and is provided with a series of sliding chutes 22, the mounting seats 21 are mounted in the sliding chutes 22 of the mounting rack 18, and the spray nozzles 19 are mounted on the mounting seats 21 through the spray nozzle support frames 20.

Before actual use, the position of the mounting seats 21 in the sliding chutes 22 is adjusted according to the size of the wheel, and the spray nozzles 19 is moved to the optimal water blowing position of the wheel. During actual use, wheels are conveyed to the position right above the device through a conveying system, a series of contacts 14 extend into central holes of the wheels, the rotating oil cylinder 6 can drive the synchronous cam 17 to rotate through the bearing B10 and the shaft 12, the arc surfaces uniformly distributed on the side wall of the synchronous cam 17 push the series of contacts 14 to synchronously move radially outwards, the series of contacts 14 finally tighten the central holes of the wheels, the rotating oil cylinder 6 fixes the synchronous cam 17 and the series of contacts 14 in the state, and wheel positioning work is completed. Then, high-pressure air is introduced, the high-pressure air sprayed from the spray nozzles 19 are blown to the wheel, meanwhile, the servo motor A2 drives the wheel to rotate through the bearing A7, and the spray nozzles 19 can be blown off through water at any position on the wheel.

What is claimed is:

1. A water blowing device, being composed of a wheel positioning rotating part and a wheel water blowing part, wherein
    the wheel positioning rotating part comprises a rack, a servo motor A, a connecting shaft, a first base, a rotating shaft, a rotary oil cylinder, a bearing A, a bearing end cover A, a second base, a bearing B, a bearing end cover B, a shaft, a shaft sleeve, contacts, springs, linear bearings and a synchronous cam;
    the servo motor A and the first base are mounted on the rack; the rotating shaft is connected with an output shaft of the servo motor A through the connecting shaft; the rotary oil cylinder, the shaft sleeve and the second base are mounted on the rotating shaft; the bearing B and the shaft are sealed inside the second base by the bearing end cover B, and two ends of the shaft are respectively connected with an output shaft of the rotary oil cylinder and the synchronous cam; three or more linear bearings are uniformly mounted on a side wall of the shaft sleeve; a side wall of the synchronous cam is provided with three or more uniformly distributed arc surfaces; the springs and the linear bearings are arranged on the ends of outer sides of the three or more contacts in a penetrating manner, and the ends of inner sides of the three or more contacts are connected with the arc surfaces of the high-precision synchronous cam; two ends of the springs are respectively in contact with shaft end surfaces of the linear bearings and the contacts; inner side ends of the contacts tightly press against the synchronous cam all the time; and the rotating shaft is mounted on the first base through the bearing A and the bearing end cover A;
    the wheel water blowing part comprises a mounting rack, spray nozzles, spray nozzle support frames, mounting seats and sliding chutes; and
    the mounting rack is fixedly arranged on the rack and is provided with a series of sliding chutes, the mounting seats are mounted in the sliding chutes of the mounting rack, and the spray nozzles are mounted on the mounting seats through the spray nozzle support frames.

2. The water blowing device according to claim 1, characterized in that the servo motor A drives the rotating shaft to rotate through the bearing A.

3. The water blowing device according to claim 1, wherein the arc surfaces uniformly distributed on the side wall of the synchronous cam push a series of contacts to synchronously move towards an outer side of a radial direction, and a pitch diameter formed by the outer sides of the series of contacts is increased.

4. The water blowing device according to claim 1, wherein in a reset process of the rotary oil cylinder, the inner side ends of the contacts are in contact with the synchronous cam all the time, and the series of contacts synchronously move towards an inner side of the radial direction.

\* \* \* \* \*